May 25, 1937.  L. E. LA BRIE  2,081,588
BRAKE
Filed June 26, 1933  4 Sheets-Sheet 1

INVENTOR.
LUDGER E. LA BRIE
BY
ATTORNEY

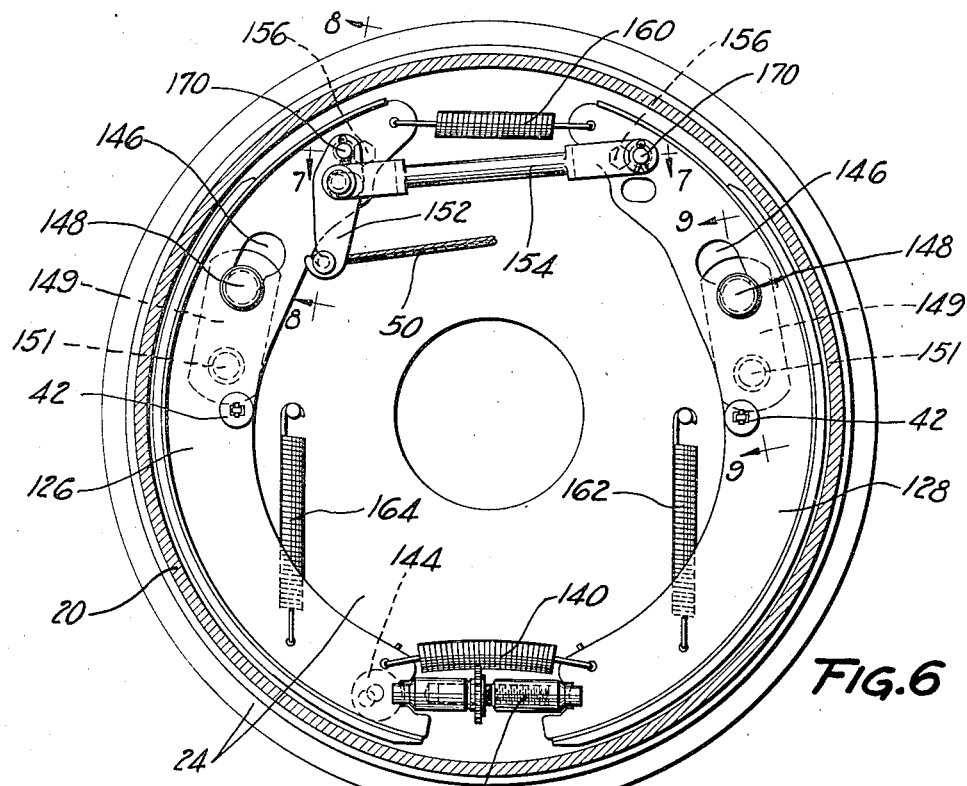
Fig.6
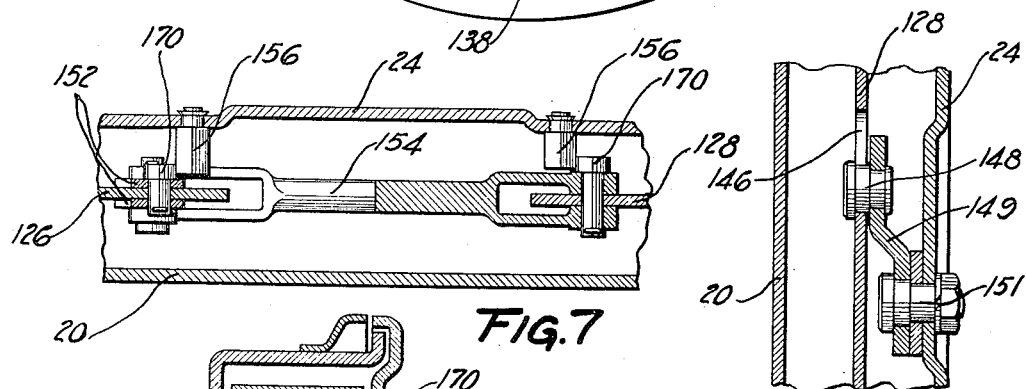
Fig.7
Fig.8
Fig.9
INVENTOR.
LUDGER E. LaBRIE
BY
ATTORNEY May 25, 1937.  L. E. LA BRIE  2,081,588
BRAKE
Filed June 26, 1933  4 Sheets-Sheet 3
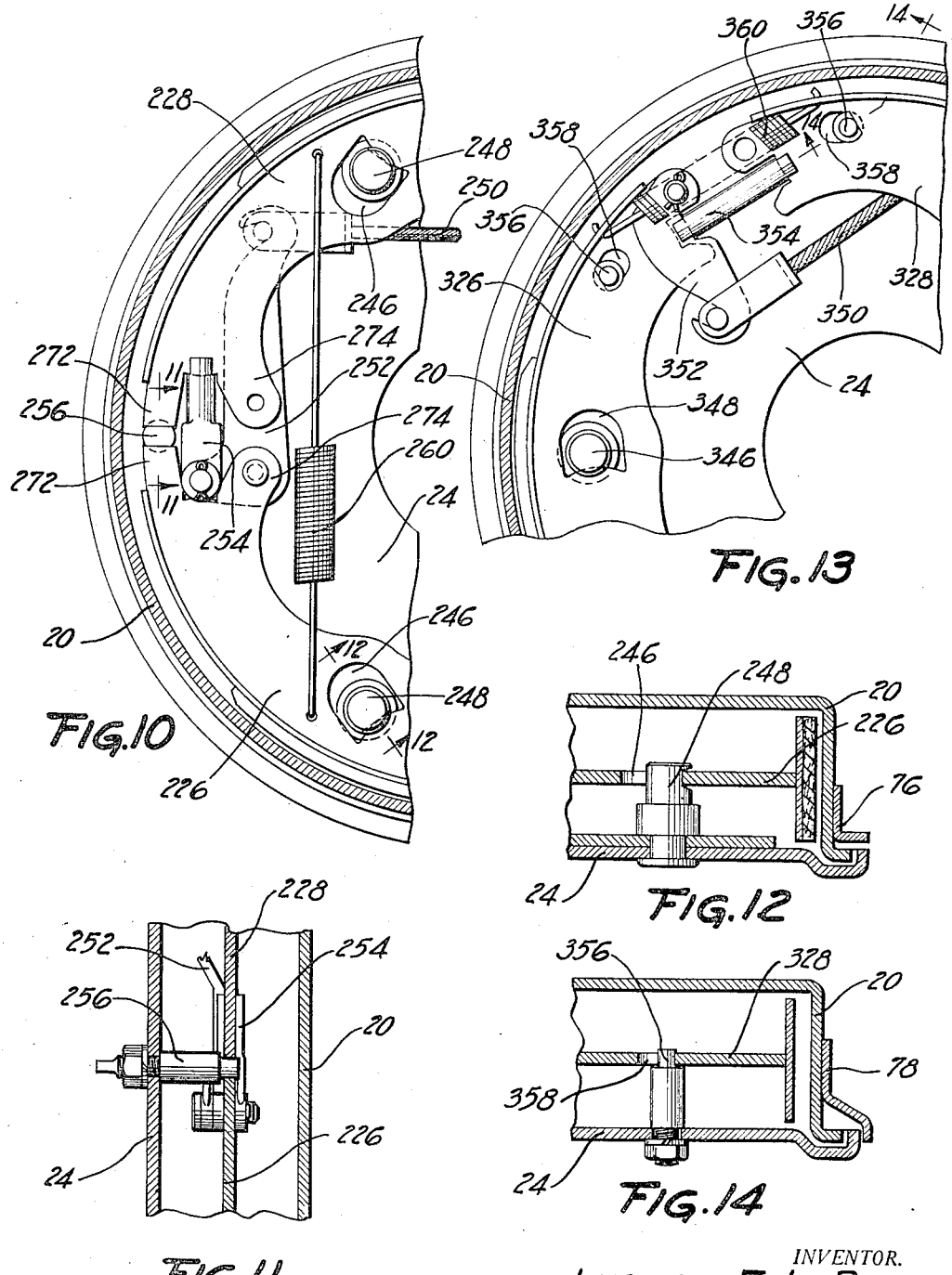
INVENTOR.
LUDGER E. LA BRIE
BY
ATTORNEYS.

INVENTOR.
LUDGER E. LA BRIE

Patented May 25, 1937

2,081,588

UNITED STATES PATENT OFFICE 2,081,588

BRAKE

Ludger E. La Brie, South Bend, Ind., assignor to Bendix Aviation Corporation, South Bend, Ind., a corporation of Delaware Application June 26, 1933, Serial No. 677,587

16 Claims. (Cl. 188—78)

This invention relates to brakes, and is illustrated as embodied in a novel four-wheel brake system having inclosed cable-operated brakes of the shiftable anchorage type.

An important object of the invention is to simplify the adjustment of a shiftable anchorage brake having its anchors between the ends of its shoes, a type of brake at present very popular for operation by power, by confining the actual manipulation as far as possible to a device which adjustably connects the lower ends of the shoes, and particularly by eliminating the necessity of adjusting the brake-operating mechanism every time the brake is adjusted to compensate for wear.

To this end, the shoes are allowed to shift radially on their anchors, which therefore determine the released positions of the shoes only in the direction of their lengths, and the ends of the shoes acted on by the applying means are arranged to pivot on stops or the like when the adjustable connection between the lower ends of the shoes is manipulated to take up for wear. Except for a stop or other positioning means which may be provided to center the shoes in the drum, this gives a single adjustment for each brake.

Various other features of novelty relate more specifically to the position, arrangement, and type of engagement of the stops so provided and on which the shoes pivot in adjusting the brake, to certain shoe structures which can advantageously be used in a brake of this sort, to novel operating means for the brakes, and to other novel combinations of parts and desirable particular constructions which will be apparent from the following description of the illustrative embodiments of the invention shown in the accompanying drawings, in which.

Figure 1:
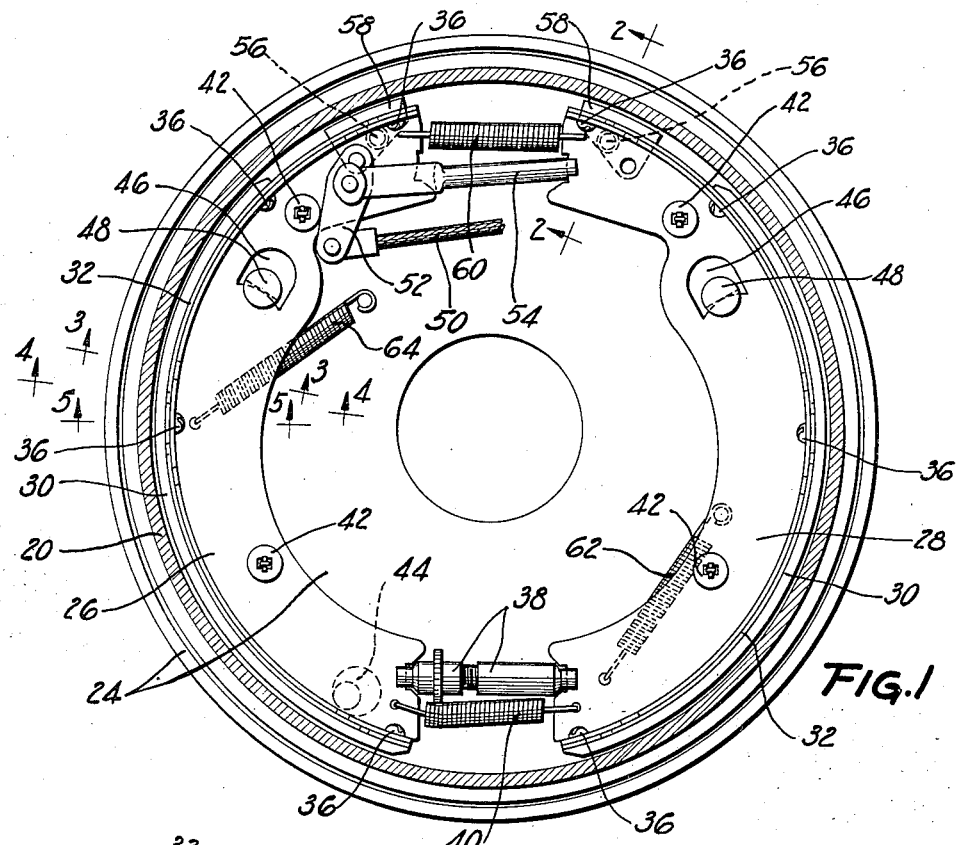
Figure 1 is a vertical section through one of the front brakes, just inside the head of the brake drum, with the brake shoes shown in side elevation.
Figure 3:
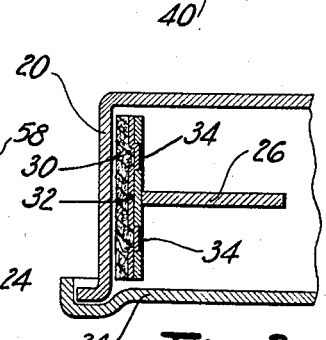
Figure 4:
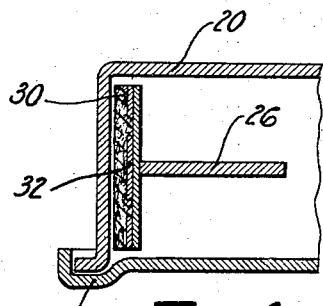
Figure 5:
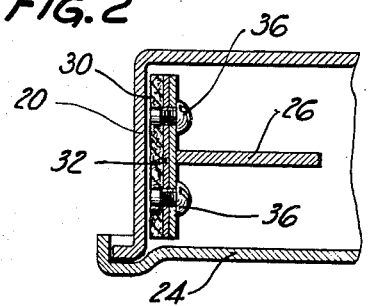
Figure 15:
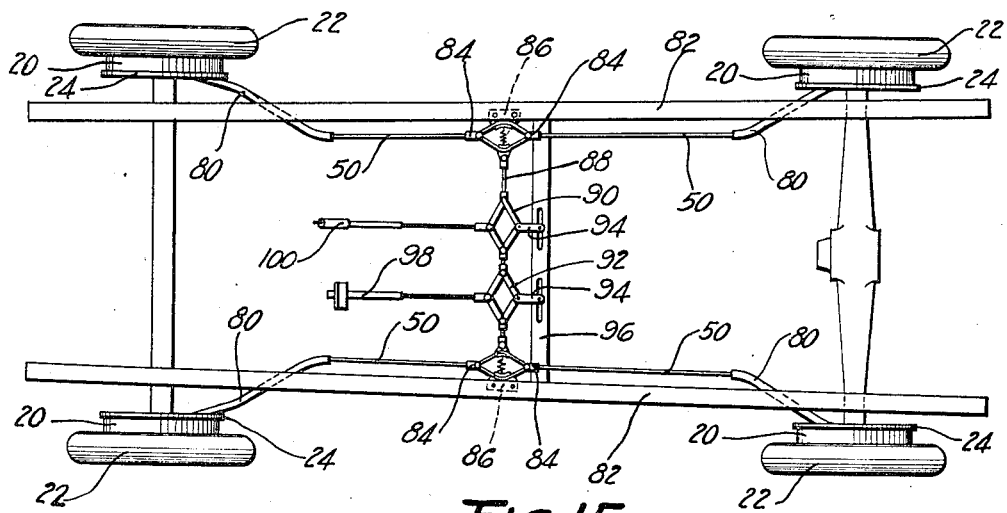
Figure 16:
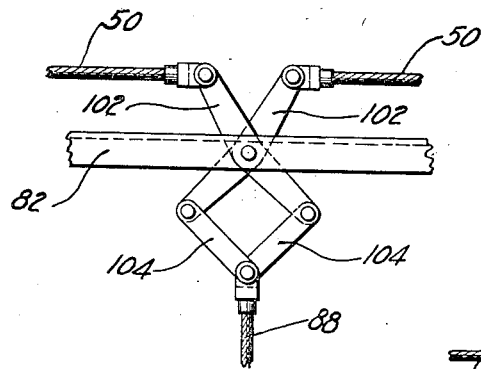
Figure 17:
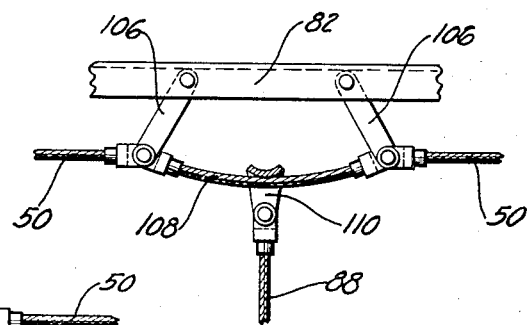
Figure 18:
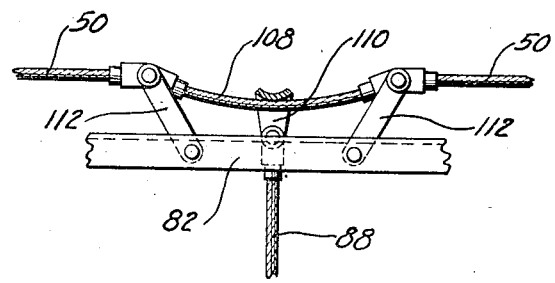

Figures 3, 4, and 5 are partial sections respectively on the lines 3—3, 4—4, and 5—5 of Figure 1, showing more particularly certain novel features in the shoe structure;

Figure 6 is a section corresponding to Figure 1, but showing a second embodiment;

Figures 7, 8, and 9 are partial sections respectively on the lines 7—7, 8—8, and 9—9 of Figure 6 and showing the operating and anchoring means of the brake;

Figure 10 is a partial section, corresponding to part of Figures 1 and 6 but showing a third embodiment;

Figure 11 is a partial section on the line 11—11 of Figure 10, and showing the arrangement of the stop on which the shoes pivot;

Figure 12 is a partial section on the line 12—12 of Figure 10, showing one of the anchors;

Figure 13 is a partial section corresponding to part of Figures 1, 6, and 10, but showing a fourth embodiment;

Figure 14 is a partial section on the line 14—14 of Figure 13, and showing the arrangement of the stop on which one of the shoes pivots;

Figure 15 is a top plan view of an automobile chassis, illustrating one form of operating mechanism which may be used for the brakes; and Figures 16, 17, and 18 are partial plan views showing three possible modifications of a part of the operating mechanism of Figure 15.

Each of the illustrated brakes includes a drum 20 rotating with the corresponding ones of the wheels 22, and at the open side of which is arranged a support such as a backing plate 24. The drum 20 and backing plate 24 of each brake constitute in effect a substantially closed brake chamber housing the brake friction means.

The brake of Figures 1-5 has its friction means in the form of two shoes 26 and 28, each having a stiffening web and an outer cylindrical rim (which may if desired be separately-formed stampings welded together), and which two shoes are for convenient and economical manufacture preferably made identical and interchangeable.

Each of the shoes is shown faced with friction brake lining 30, preferably molded and cured in place on a metal back 32 with the lining material interlocked with openings formed in the back 32 as shown in Figure 4. The lining 30 also interlocks with depressions 34, which on the opposite side of the back 32 project as bosses seated in corresponding openings in the rim of the brake shoe, and preventing the lining from creeping or shifting lengthwise of the shoe. The lining is prevented from separating from the rim of the shoe by suitable means such as screws or other fastenings 36.

The lower ends of the shoe webs are shown notched for pivotal engagement with the forked ends of an adjusting device 38 of a well-known form, which consists of two end pieces having aligned sockets (one or both of which may be threaded) receiving a central part which is turned to spread apart the ends of the shoes to adjust the brake. The central part of the adjusting device has a collar by which it is manipulated and which is notched peripherally to be yieldingly locked in adjusted position by engagement with a spring 40 which is connected to and tensioned between the shoe ends, and which also serves to hold the shoes against the ends of the adjusting device.

The shoes may be provided with any suitable and desired steady rest or anti-rattle devices 42. The lower end of shoe 26 is shown with its rim engaging (when the brake is released) an eccentric or other stop 44 carried by the backing plate, for example with its stem projecting through the backing plate so that it may be manipulated from outside the brake. The stop 44 may be adjusted, when desired, to center the shoe assembly relatively to the drum.

Each of the shoes 26 and 28 is shown provided between its ends, and preferably a short distance above its center, with an elongated anchor opening 46 extending through its web and encircling an anchor such as a post 48 carried by the backing plate. Each anchor has a flat lower side, shown arranged substantially on a radius of the brake, and which is slidably engaged by the rounded upwardly-projecting lower edge of the corresponding opening 46. The openings 46 are wide enough (radially of the brake) to permit the shoes a considerable range of radial movement as they slide on their anchors 48.

The brake may be applied by means such as a horizontal steel cable 50, extending through the backing plate 24, and connected at its end to an applying lever 52 which is pivoted to the end of the web of shoe 26 and connected by a thrust link 54 to the end of the shoe 28. The link 54 may be notched at its end to embrace the end of the web of shoe 28, the end of the web having a notch with a rounded surface pivotally engaged by the end of the link 54.

According to an important feature of the present invention, in order to obviate the necessity of adjusting the above-described applying means every time the brake is adjusted for wear, when the device 38 is manipulated (with the brake released) to spread the lower ends of the shoes to take up for wear, the upper ends of the shoes pivot upon means such as fixed stops 56 carried by the backing plate. In this particular embodiment the stops engage the inner face of the rims of the shoes.

Figure 2:
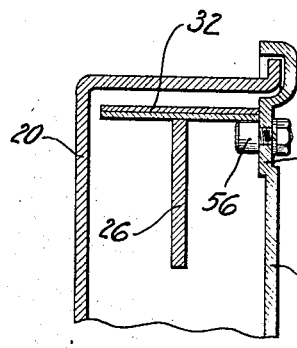
Figure 2 is a partial section on the line 2—2 of Figure 1, showing the arrangement of one of the stops.

As shown in Figure 2, a zone 58 of the backing plate may be flattened out around each stop 56, to provide an extended surface engaged by the edge of the shoe rim as it pivots about the stop 56. During this pivotal movement of the shoes, they shift freely radially on the anchors 48. After the adjustment, if necessary, the shoes may again be accurately centered by means of the eccentric stop 44.

The upper ends of the shoes are connected by a return spring 60, which urges the shoes against the stops 56 when the brake is released. An auxiliary return spring 62 is tensioned between the lower end of the shoe 28 and the backing plate 24, and is inclined at such an angle that it not only urges shoe 24 lengthwise against its anchor 48 but also tends to turn the shoe about the anchor to hold the shoe rim against its stop 56.

A third spring 64 is tensioned between shoe 26 and the backing plate, and is inclined at such an angle that it has a component urging shoe 26 lengthwise upward against its anchor 48, and also has another component urging the shoe bodily toward the right in Figure 1, holding the opposite ends of the shoe yieldingly against the stops 56 and 44 respectively.

A secondary function of the spring 64 is to hold the shoe 26 anchored, while the brake is being applied, until shoe 28 engages the drum and the entire shoe assembly is wiped by the friction of the drum in one direction or the other to its final applied position in anchoring engagement with one or the other of the anchors 48. The shoe 26 is the "secondary" shoe, i. e. it is the one which anchors when the car is moving forward, so that in forward braking the spring 64 insures that the shoe 26 remains throughout in contact with its anchor 48.

In the arrangement of Figures 6–9, the shoes 126 and 128 are connected by an adjusting device 138 yieldingly locked by a spring 140 tensioned between the shoes, and are operated by a lever 152 mounted on the shoe 126 and connected by a link 154 to shoe 128, the lever 152 being actuated by the cable 50. In this case, auxiliary return springs 162 and 164 (which cooperate with the main return spring 160) are tensioned between the backing plate and the shoes 126 and 128 respectively.

The auxiliary springs 162 and 164 urge the two shoes lengthwise in an upward direction, to hold the lower ends of elongated slots 146 in the shoe webs against anchor pins 148 carried by swinging tension anchor links 149 mounted on anchor pivots 151 carried by the backing plate. The shoes are centered, as before, by means such as an adjustable eccentric 144 engaging the lower end of the shoe 126.

In this embodiment, the lever 152 (which is in two parts embracing the web of shoe 126 between them) and the end of link 154 are connected to the webs of the shoes by pivots 170 which have enlarged heads which engage the flat sides of hexagonal stop pins 156 riveted in the backing plate. In this case the shoes, while the connection 138 is being adjusted, pivot about the points of engagement between the heads of pivots 170 and the stop pins 156.

In the arrangement of Figures 10–12, shoes 226 and 228 have enlarged openings 246 for the anchors 248, which have flat sides slidably engaged by the curved edges of openings 246 in the same manner as in Figure 1. The shoes are spread apart to apply the brake, against the resistance of a return spring 260, by a bellcrank lever 252 pivoted on the shoe 226 and connected to an operating cable 250.

The webs of the shoes 226 and 228 are formed at their ends with pairs of projections 272 and 274, with the bellcrank lever 252 pivoted on the inner projection 274 on the shoe 226, the corresponding projection 274 on the shoe 228 being provided merely so that the shoes are interchangeable. The projections define between them an intervening space, in which is arranged a vertical thrust link 254 pivoted to the short horizontal arm of the bellcrank lever 252, and notched at its upper end to embrace and pivotally engage the end of the web of the shoe 228.

In this embodiment a pin 256 is carried by the backing plate between the projections 272 of the shoe webs, and with its flattened opposite sides forming the stops upon which the shoes pivot during adjustment.

In the brake of Figures 13 and 14, shoes 326 and 328 have openings 346 for flat-sided anchors 348, and are applied against the resistance of a return spring 360 by a cable 350 actuating a lever 352 pivoted on the shoe 326 and connected by a link 354 to the shoe 328. In this embodiment the shoes pivot during adjustment on stop pins 356 projecting through elongated openings 358 in the shoe webs.

In Figures 12 and 14, the brake drum 20 is shown encircled by a stamped steel baffle ring 76 or 78 cooperating with the edge flanges of the drum and backing plate to provide a joint which is effectively protected.

The above-described brakes may be operated by a mechanism or hookup such as shown in Figures 15-18. The cables 50 are carried in the usual manner through flexible Bowden conduits 80, which form in effect flexible extensions of the four brake chambers or housings, and which are secured to the brake backing plates at their outer ends and to side members 82 of the chassis frame at their inner ends.

The adjacent inner ends of the two right-hand cables 50, and of the two left-hand cables 50, are connected as shown in Figure 15 by suitable fittings 84 so that the end portions overlap each other, giving doubled cable portions. The outer branch of each doubled cable portion engages a bracket 86 carried by the adjacent side member 82, and the inner branch is connected to the corresponding end of a cross tension connection 88, the whole forming a linkage something like what is known as a lazy-tongs. Tension on the cross connection 88 is converted by this linkage into tension on the four cables 50.

The cross connection 88 includes two lazy-tongs linkages 90 and 92, connected at one side by links 94 to a cross member 96 of the chassis frame, and connected at the other side respectively to the service pedal 98 and the emergency or hand lever 100. Thus operation of either the pedal or the emergency lever applies tension to the four cables 50.

In the modification of Figure 16, each (right or left) pair of cables is connected to a pair of horizontal levers 102 pivoted on the frame member 82, and connected by links 104 to the end of the cross connection 88.

In Figure 17 is shown an arrangement in which the ends of cables 50 are connected to the frame member 82 by inwardly-extending swinging struts or links 106, and to each other by a short cable or the like 108 engaged and tensioned by a stirrup 110 on the end of the cross connection 88. Figure 18 shows a construction in which the swinging struts 112 extend outwardly from the frame member instead of inwardly.

While several illustrative embodiments have been described in detail, it is not my intention to limit the scope of the invention to those particular embodiments or otherwise than by the terms of the appended claims.

I claim:

1. A brake comprising a pair of shoes having adjacent ends connected by an adjustable device, anchor means between the ends of each shoe which holds the shoe against lengthwise movement in one direction and thereby takes the braking torque but which permits radial movement of the shoe, and means for cooperating with the adjustable device and with the anchor means to determine the released positions of the shoes and which includes parts upon which the unconnected ends of said shoes may pivot when said device is adjusted to spread the connected ends of the shoes and shift the shoes radially on the anchor means.

2. A brake comprising a pair of shoes having adjacent ends connected by an adjustable device, an anchor between the ends of each shoe which holds the shoe against lengthwise movement away from its connected end but permitting it to move in the opposite direction and which thereby takes the braking torque of both shoes when the force is in one direction, each anchor permitting radial movement of its shoe relatively thereto, and means for cooperating with the adjustable device and with the anchors to determine the released positions of the shoes and which includes parts upon which the unconnected ends of said shoes may pivot when said device is adjusted to spread the connected ends of the shoes and shift the shoes radially on the anchors.

3. A brake comprising a pair of shoes having adjacent ends connected by an adjustable device, anchor means between the ends of each shoe which holds the shoe against lengthwise movement in one direction and thereby takes the braking torque of the shoe, but which permits radial movement of the shoe, means for cooperating with the adjustable device and with the anchor means to determine the released positions of the shoes and which includes parts upon which the unconnected ends of said shoes may pivot when said device is adjusted to spread the connected ends of the shoes and shift the shoes radially on the anchor means, and an applying device acting on the end of the shoes engaging said parts and which by reason of the pivoting of said shoes on said parts during the adjustment of said device is substantially unaffected by adjustments of said device.

4. A brake comprising a pair of shoes having adjacent ends connected by an adjustable device, an anchor between the ends of each shoe which holds the shoe against lengthwise movement away from its connected end but permitting it to move in the opposite direction and which thereby takes the braking torque of both shoes when the force is in one direction, each anchor permitting radial movement of its shoe relatively thereto, means for cooperating with the adjustable device and with the anchors to determine the released positions of the shoes and which includes parts upon which the unconnected ends of said shoes may pivot when said device is adjusted to spread the connected ends of the shoes and shift the shoes radially on the anchors, and an applying device acting on the ends of the shoes engaging said parts and which by reason of the pivoting of said shoes on said parts during the adjustment of said device is substantially unaffected by adjustments of said device.

5. A brake comprising a pair of anchors generally across the brake from each other, a pair of adjustably connected shoes respectively anchoring and radially shiftable on said anchors at the respective anchoring points of the shoes, and fixed stops engaged respectively by the unconnected ends of the shoes when the brake is released.

6. A brake comprising a pair of anchors generally across the brake from each other, a pair of adjustably connected shoes respectively anchoring on and radially slidable with respect to said anchors at the respective anchoring points of the shoes, and fixed stops engaged respectively by the unconnected ends of the shoes when the brake is released.

7. A brake comprising a pair of shoes having elongated slots in their webs, anchors in said slots and slidably engaged by the shoe webs, adjustable means connecting the ends of the shoes at one side of the brake, and stops engaged by the ends of the shoes at the other side of the brake when the brake is released.

8. A brake comprising a pair of shoes having elongated slots in their webs, anchors having swinging links with parts projecting into said slots, adjustable means connecting the ends of the shoes at one side of the brake, and stops engaged by the ends of the shoes at the other side of the brake when the brake is released.

9. A brake comprising a pair of shoes having elongated slots in their webs, anchors having swinging links with parts projecting into said slots, adjustable means connecting the ends of the shoes at one side of the brake, applying means having pivots connecting it to the ends of the shoes at the other side of the brake, and stops engaged by said pivots respectively when the brake is released.

10. A brake comprising a pair of shoes each having a rim and a web, anchors respectively between the ends of the shoes and which permit radial shifting of the shoes thereon at the respective anchoring points of the shoes, adjustable means connecting the ends of the shoes at one side of the brake, and fixed stops engaged by the rims of the shoes adjacent the ends of the shoes at the other side of the brake.

11. A brake comprising a pair of shoes each having a rim and a web, anchors respectively between the ends of the shoes and which permit radial shifting of the shoes thereon at the respective anchoring points of the shoes, adjustable means connecting the ends of the shoes at one side of the brake, and fixed stops adjacent the ends of the shoes engaged by the webs of the shoes at the ends of the shoes at the other side of the brake.

12. A brake comprising a pair of shoes each having a rim and a web, anchors respectively between the ends of the shoes and which permit radial shifting of the shoes thereon, adjustable means connecting the ends of the shoes at one side of the brake, applying means having pivots engaging the other ends of the shoes, and stops engaged by said pivots.

13. A brake comprising a pair of shoes each having a rim and a web, anchors respectively between the ends of the shoes and which permit radial shifting of the shoes thereon, adjustable means connecting the ends of the shoes at one side of the brake, applying means acting on the other ends of the shoes, and stops engaged by parts of said applying means and through said means positioning said other ends of the shoes.

14. A brake having a pair of shoes provided with webs which are forked to provide two projections at the end of each shoe with an intervening space, a stop arranged between the outer projections of the two webs, a lever pivoted on the inner projection of the web of one shoe, a thrust link in said intervening space engaged by one arm of the lever and engaging the web of the other shoe, and anchorage means for said shoes.

15. A brake having a pair of shoes provided with webs which are forked to provide two projections at the end of each shoe with an intervening space, stop means arranged to engage the two webs at the ends of the shoes, a lever pivoted on one of the projections of the web of one shoe, a thrust link in said intervening space engaged by one arm of the lever and engaging the web of the other shoe, and anchorage means for said shoes.

16. A brake shoe having a web formed at the end of the shoe with two projections and an intervening unobstructed space and having in said web an anchor bearing comprising an elongated opening having at one end a curved edge.

LUDGER E. LA BRIE.